(12) United States Patent
Ji et al.

(10) Patent No.: US 11,953,366 B2
(45) Date of Patent: Apr. 9, 2024

(54) FLUID LEVEL MEASUREMENT SYSTEM USING BUOYANT BODY

(71) Applicant: HANRA IMS CO., LTD, Busan (KR)

(72) Inventors: Suk Joon Ji, Busan (KR); Young Gu Kim, Busan (KR); Jong Min Chung, Changwon-si (KR); Chae Ho Lee, Busan (KR); I-Hwan Cheon, Busan (KR); Kwang Ik Chun, Busan (KR); Dong Sik Jang, Busan (KR)

(73) Assignee: HANRA IMS CO., LTD, Busan (KR)

( * ) Notice: Subject to any disclaimer, the term of this patent is extended or adjusted under 35 U.S.C. 154(b) by 0 days.

(21) Appl. No.: 17/860,033

(22) Filed: Jul. 7, 2022

(65) Prior Publication Data

US 2023/0034044 A1 Feb. 2, 2023

(30) Foreign Application Priority Data

Jul. 28, 2021 (KR) ........................ 10-2021-0098946

(51) Int. Cl.
*G01F 23/64* (2006.01)
*G01F 23/60* (2006.01)

(52) U.S. Cl.
CPC .................................. *G01F 23/603* (2013.01)

(58) Field of Classification Search
CPC ........ G01F 23/603; G01F 23/64; G01F 23/76; G01F 23/284; G01F 23/306; G01F 23/0038

USPC .......... 73/305–308, 313, 314, 322.5, 290 V, 73/290 B

See application file for complete search history.

(56) References Cited

FOREIGN PATENT DOCUMENTS

| CN | 57074620 A | * | 12/2018 | |
|---|---|---|---|---|
| CN | 108955820 A | * | 12/2018 | |
| CN | 110231072 A | * | 9/2019 | ........... G01F 23/296 |
| CN | 111044122 A | * | 4/2020 | |
| CN | 112097854 A | * | 12/2020 | |
| DE | 202004018739 U1 | * | 4/2005 | ............. G01F 23/64 |
| RU | 2683878 C1 | * | 4/2019 | |

\* cited by examiner

*Primary Examiner* — Robert R Raevis
(74) *Attorney, Agent, or Firm* — United One Law Group LLC; Kongsik Kim; Jhongwoo Peck

(57) ABSTRACT

A fluid level measurement system using a buoyant body includes a guide part installed in a direction perpendicular to the bottom surface of a fluid storage tank, and provided with a space in which a fluid can move therein; a buoyant body inserted into the guide part, and configured to float along the surface of the fluid inside the guide part; and a measurement part coupled to the top end of the guide part, and configured to measure the level of the surface of the fluid inside the fluid storage tank by transmitting a signal toward the buoyant body in the inner space of the guide part and then receiving a signal reflected from the buoyant body.

11 Claims, 8 Drawing Sheets

FLUID LEVEL MEASUREMENT SYSTEM USING BUOYANT BODY

CROSS-REFERENCE TO RELATED APPLICATION

This application claims priority from Korean Application No. 10-2021-0098946 filed on Jul. 28, 2021, which is incorporated herein by reference in its entirety.

BACKGROUND

1. Technical Field

The content disclosed therein relates to a fluid level measurement system using a buoyant body, and more particularly to a fluid level measurement system using a buoyant body that can receive a signal reflected from a buoyant body, by using the buoyant body that is inserted into a guide part and can be selectively raised and lowered smoothly while maintaining a reflective surface in parallel with the surface of a fluid according to the level of the fluid, and can then measure the level of the fluid based on the signal.

2. Description of the Related Art

Radar level measurement systems are widely used to determine the fill levels of products contained in tanks. In general, radar level measurement systems perform measurement via a non-contact measurement scheme in which an electromagnetic signal is radiated toward a product contained in a tank, or via a contact measurement scheme using a probe in which an electromagnetic signal acts as a waveguide.

In the case of the non-contact measurement scheme, a transmitted electromagnetic signal is reflected from the surface of a product, the reflected signal is received and transmitted by a receiver, and a distance to the surface of the product can be determined based on the reflected signal.

Meanwhile, liquefied natural gas (LNG) is stored in a tank in a cryogenic state at a temperature of about −160° C., and a non-contact measurement scheme has been disclosed to measure an LNG fill level in the cryogenic state. However, this conventional measurement scheme has a problem in that it is difficult to distinguish between a signal reflected from the surface of a fluid and a signal reflected from the bottom of a tank due to the low dielectric constant of LNG, so that the accuracy of level measurement is deteriorated.

Therefore, there is an emerging need for a new type of fluid level system that can be applied even to cryogenic LNG.

PRIOR ART LITERATURE

Patent Literature (Patent document 1) Japanese Patent No. 6809684
(Patent document 2) Korean Patent No. 10-1877889
(Patent document 3) Japanese Unexamined Patent Application Publication No. 2005-147924
(Patent document 4) Korean Utility Model Application Publication No. 20-2000-0011810

SUMMARY

A fluid level measurement system using a buoyant body according to an embodiment of the present disclosure has been conceived to overcome the above-described problems, and an object of the present invention is to provide a fluid level measurement system that can precisely measure the level of a fluid based on a signal reflected from a reflective surface by using a buoyant body that is inserted into a guide part and can be selectively raised and lowered smoothly while maintaining the reflective surface in parallel with the surface of a fluid according to the level of the fluid.

In order to accomplish the above object, an embodiment of the present disclosure provides a fluid level measurement system using a buoyant body, the fluid level measurement system including: a guide part installed in a direction perpendicular to the bottom surface of a fluid storage tank, and provided with a space in which a fluid can move therein; a buoyant body inserted into the guide part, and configured to float along the surface of the fluid inside the guide part; and a measurement part coupled to the top end of the guide part, and configured to measure the level of the surface of the fluid inside the fluid storage tank by transmitting a signal toward the buoyant body in the inner space of the guide part and then receiving a signal reflected from the buoyant body.

The guide part may include a body module formed by coupling at least two pipe units and an end module coupled to the bottom end of the body module, and a fluid inlet portion in a ring plate shape may be provided at one end of the end module.

The buoyant body may include an upper module provided with a reflective surface at the top end thereof, a lower module coupled to the bottom end of the upper module, and at least one buffer module coupled to the side surface of the upper module and configured to prevent the buoyant body from being caught in the guide part when the buoyant body is selectively raised and lowered inside the guide part.

The upper module and the lower module may be formed in structures that pass through the fluid inlet portion, and the movement of the upper module may be blocked by the buffer module being caught in the fluid inlet portion.

The upper module and the lower module may be formed in cylindrical structures.

The upper module may be formed in a cylindrical structure, and the lower module may be formed in a hemispherical structure.

The reflective surface may be made of any one material of stainless steel, aluminum, manganese, nickel, and titanium.

At least one penetration hole through which the fluid can move may be provided at a predetermined position of the fluid inlet portion.

The guide part may further include an airtight maintenance module coupled to a predetermined position of the top end of the body module, a signal from the measurement part may pass through the airtight maintenance module, and the movement of a fluid or gas may be blocked by the airtight maintenance module.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION

Figure 1:
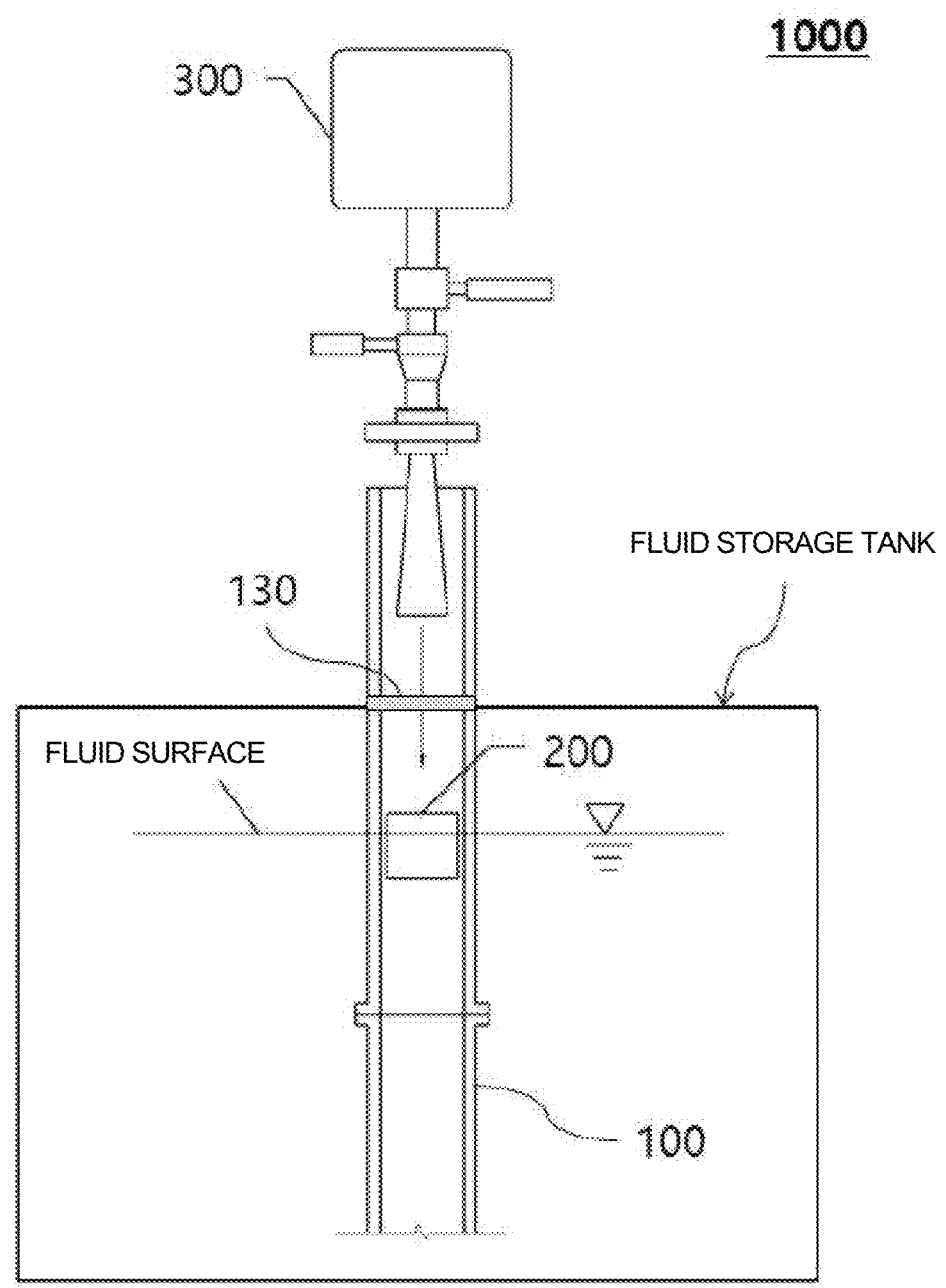
FIG. 1 is a conceptual diagram schematically showing a fluid level measurement system using a buoyant body according to an embodiment of the present disclosure.

Advantages and features of the present invention and methods for achieving them will become apparent with reference to the embodiments to be described below in detail in conjunction with the accompanying drawings. However, the present invention is not limited to the embodiments to be disclosed below, but may be implemented in various different forms. These embodiments are provided merely to make the disclosure of the present invention complete and to completely inform those of ordinary skill in the art to which the present invention pertains of the scope of the invention. The present invention is defined only by the scope of the claims. Throughout the specification, like reference numerals refer to like components.

In the following description of the embodiments of the present invention, when it is determined that a detailed description of a well-known function or configuration may unnecessarily obscure the gist of the present invention, the detailed description will be omitted. Furthermore, the terms to be described later are terms that are defined by taking into consideration corresponding functions in the embodiments of the present invention, which may vary depending on the intention or custom of a user or an operator. Accordingly, the definitions thereof should be made based on the overall content throughout the present specification.

Figure 2:
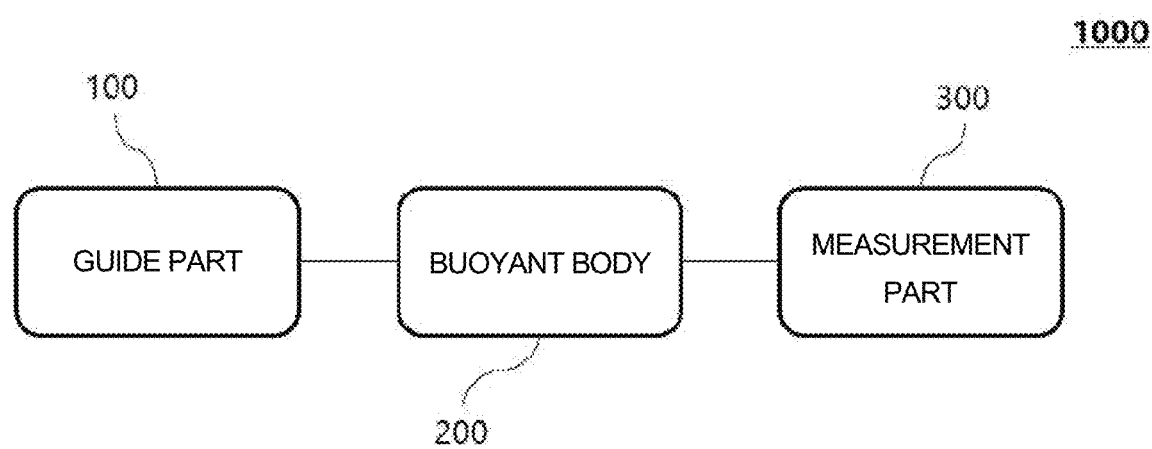
FIG. 2 is a block diagram schematically showing the configuration of the fluid level measurement system using a buoyant body according to the embodiment of the present disclosure.
Figure 3:
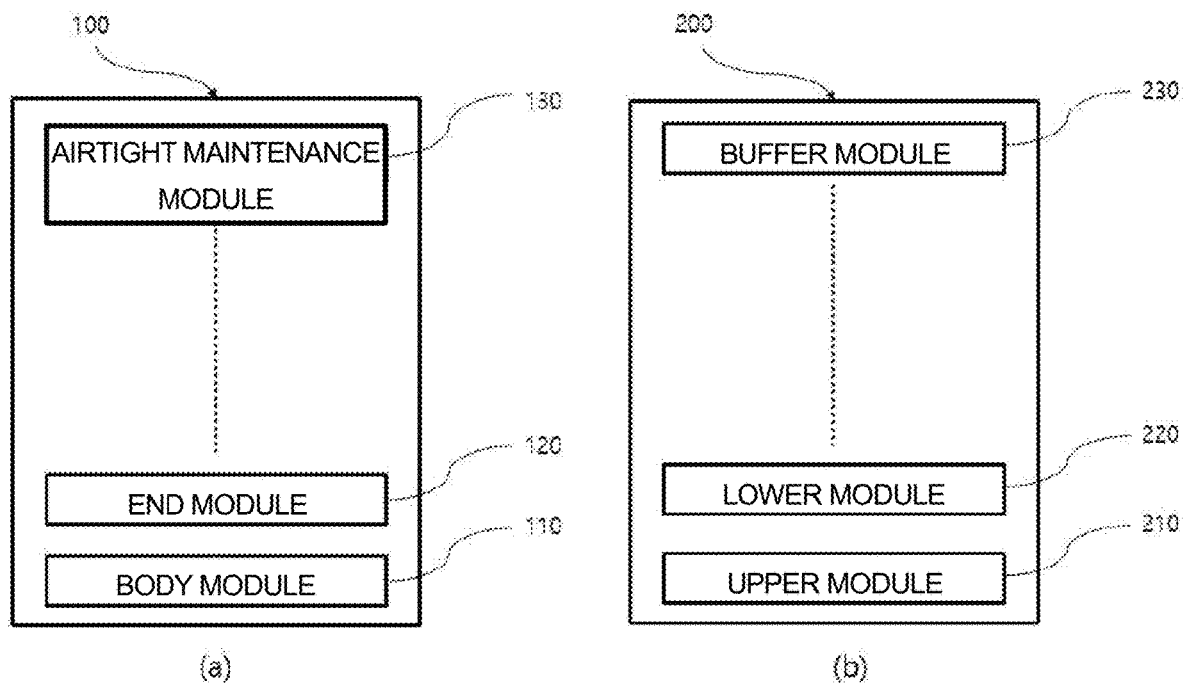
FIG. 3 is a block diagram schematically showing the configurations of a guide part and a buoyant body according to an embodiment of the present disclosure.
Figure 4:
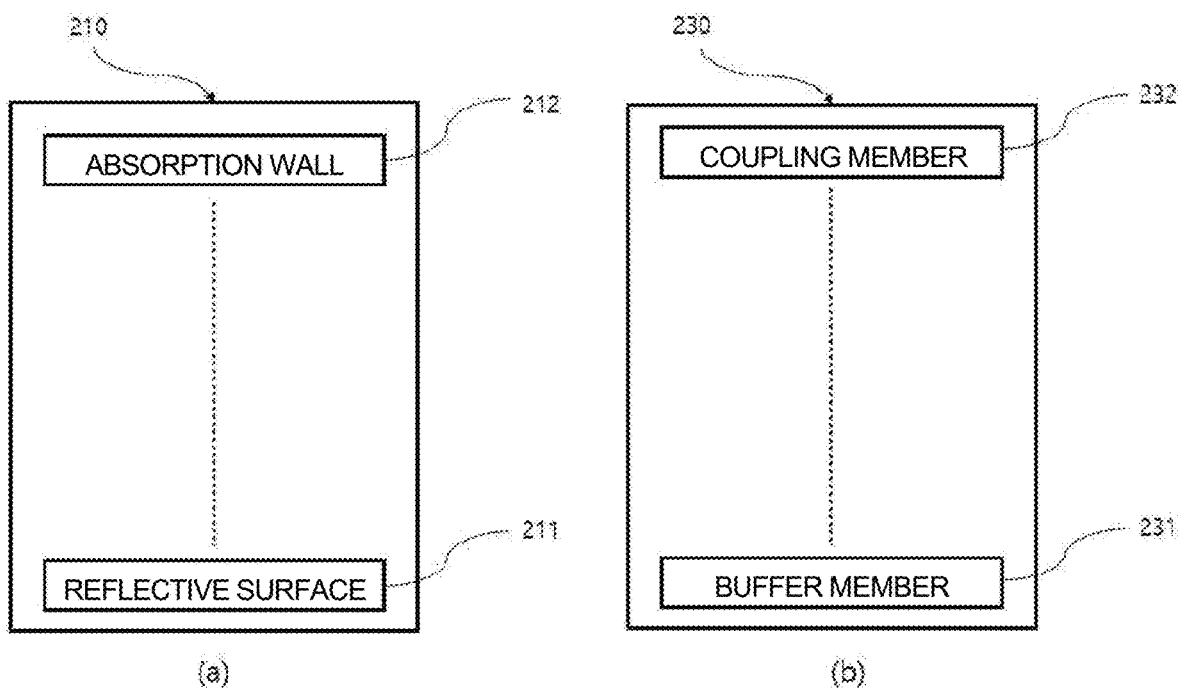
FIG. 4 is a block diagram schematically showing the configurations of an upper module and a buffer module according to an embodiment of the present disclosure.
Figure 5:
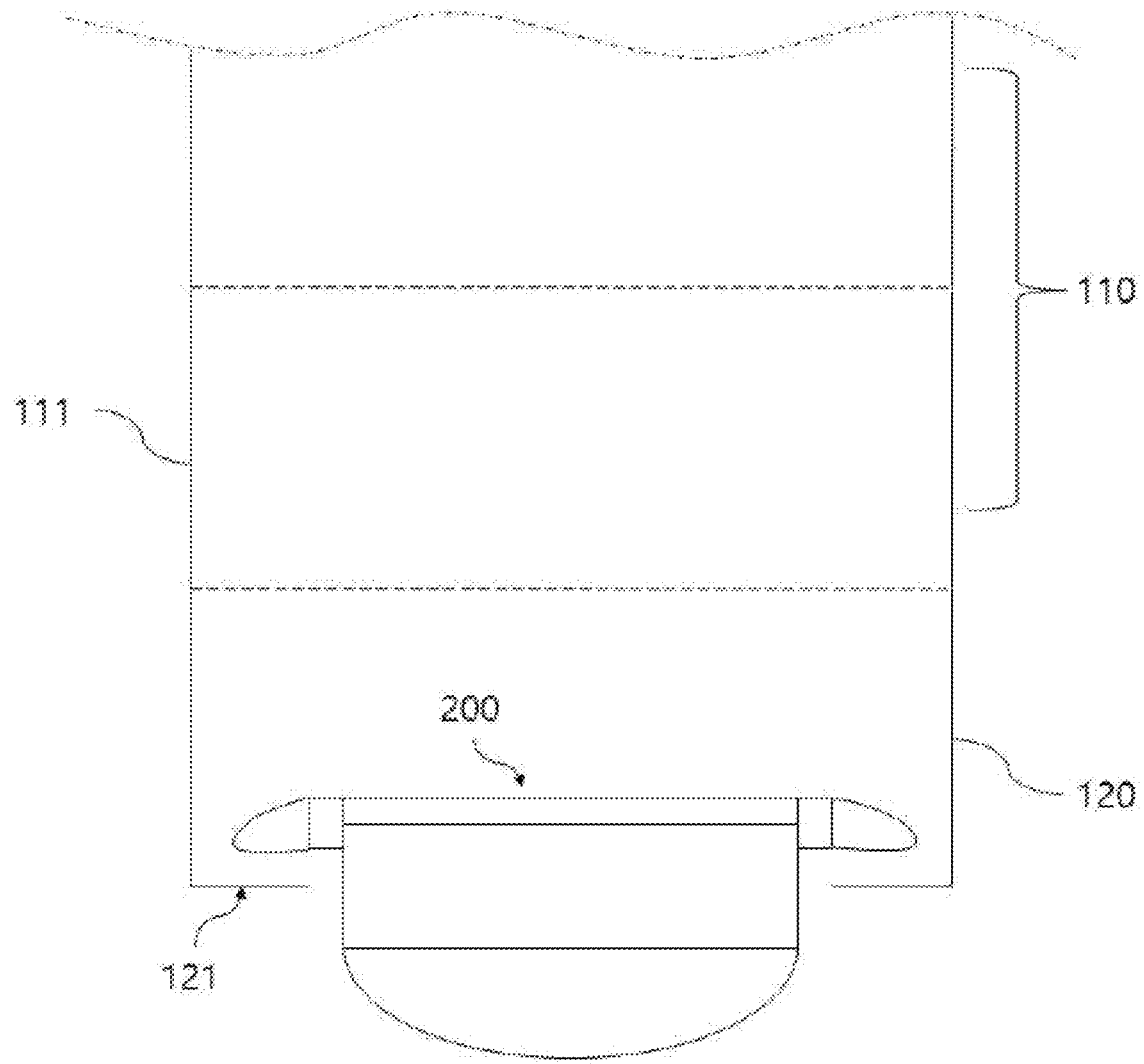
FIGS. 5 and 6 are views illustrating a guide part according to an embodiment of the present disclosure in detail.
Figure 6:
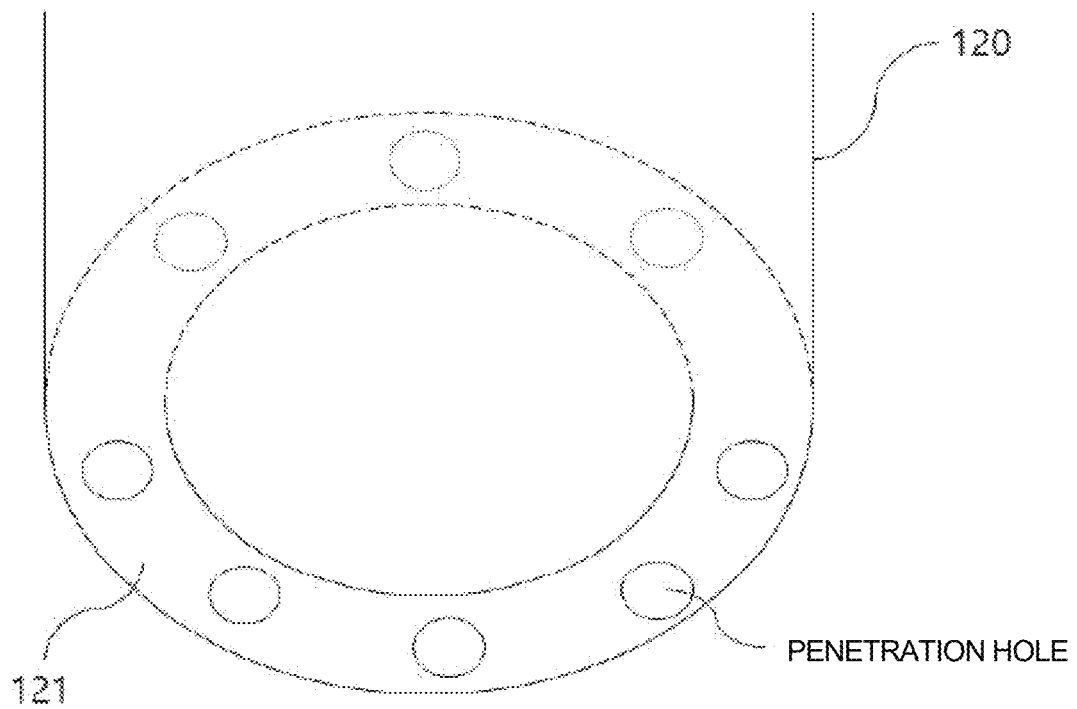
Figure 7:
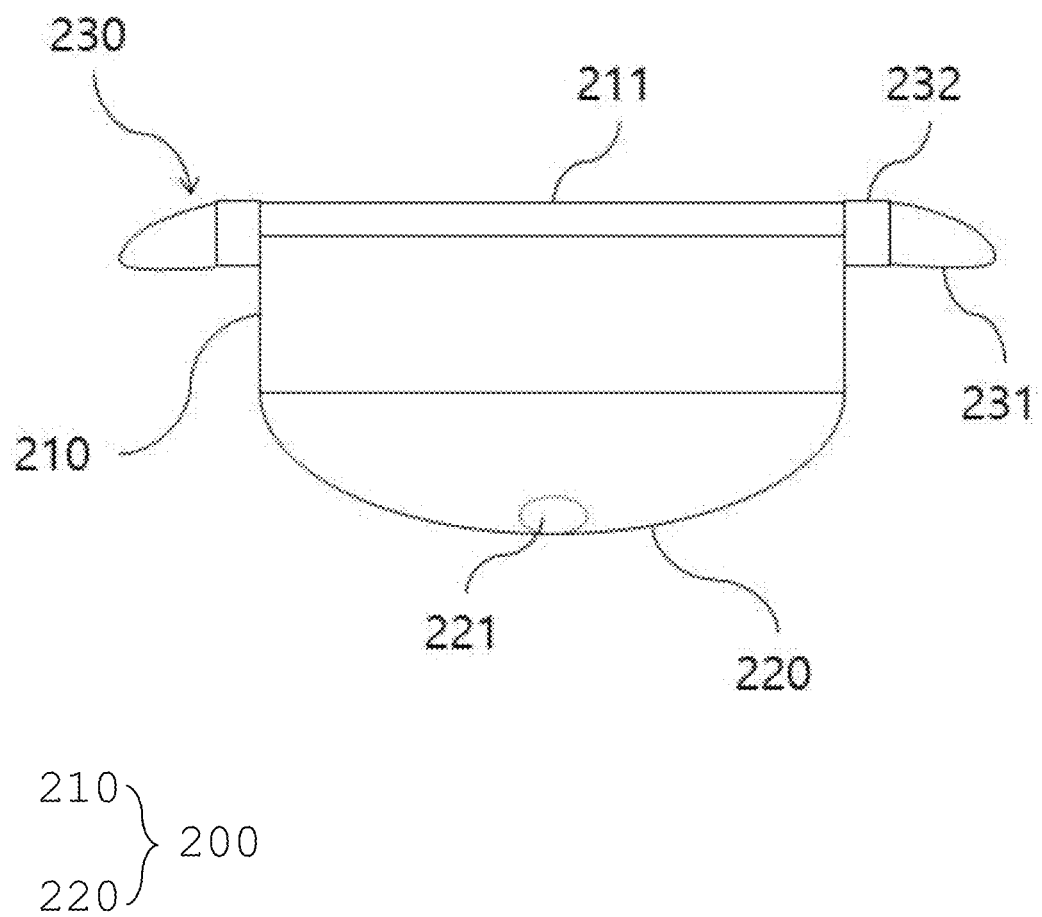
FIGS. 7 and 8 are diagrams illustrating a buoyant body according to an embodiment of the present disclosure in detail.
Figure 8:
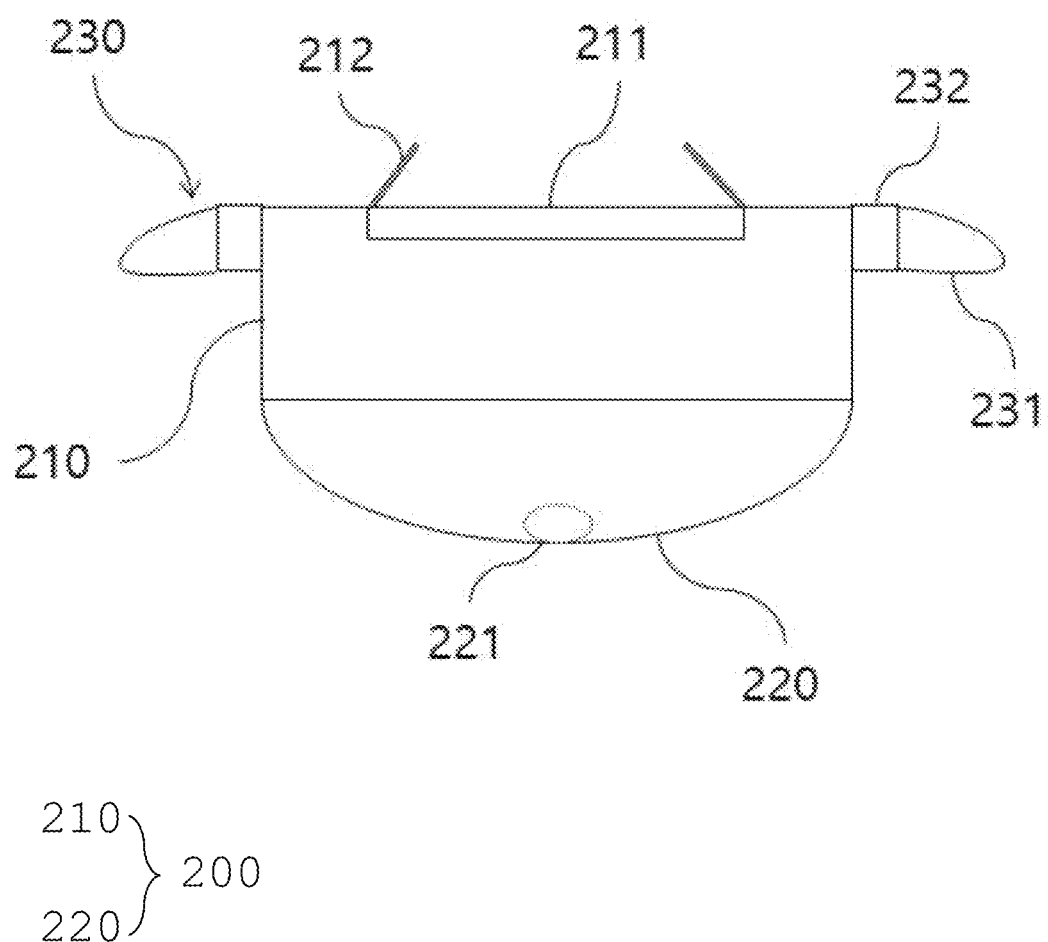

FIG. 1 is a conceptual diagram schematically showing a fluid level measurement system using a buoyant body according to an embodiment of the present disclosure, FIG. 2 is a block diagram schematically showing the configuration of the fluid level measurement system using a buoyant body according to the embodiment of the present disclosure, FIG. 3 is a block diagram schematically showing the configurations of a guide part and a buoyant body according to an embodiment of the present disclosure, FIG. 4 is a block diagram schematically showing the configurations of an upper module and a buffer module according to an embodiment of the present disclosure, FIGS. 5 and 6 are views illustrating a guide part according to an embodiment of the present disclosure in detail, and FIGS. 7 and 8 are diagrams illustrating a buoyant body according to an embodiment of the present disclosure in detail.

<Fluid Level Measurement System Using a Buoyant Body According to the Embodiment of the Present Disclosure>

Referring to FIGS. 1 to 8, the fluid level measurement system using a buoyant body according to the embodiment of the present disclosure may include a guide part 100, a buoyant body 200, and a measurement part 300.

As shown in FIG. 1, the guide part 100 may be spaced apart from the bottom surface of a fluid storage tank and installed in a vertical direction, and a space in which a fluid can move may be formed inside the guide part 100.

Referring to FIGS. 3(a) and 5, the guide part 100 may be configured to include a body module 110, and an end module 120 coupled to the bottom end of the body module 110.

As shown in FIG. 5, the body module 110 may be formed to have various lengths by coupling at least two or more pipe units 111 to each other. Although it is preferable that these pipe units 111 are coupled by flange coupling, they are not necessarily limited thereto.

As shown in FIG. 6, a fluid inlet portion 121 may be provided at one end of the end module 120, and the fluid stored in the fluid storage tank may be configured to flow into the guide part 100 through the fluid inlet portion 121.

More specifically, although the fluid inlet portion 121 is preferably formed in the shape of a ring plate with a part thereof opened, it is not necessarily limited thereto, and may be configured in various shapes as needed.

As the fluid stored in the fluid storage tank flows into the guide part 100 through the fluid inlet portion 121, the surface of the fluid inside the fluid storage tank and the surface of the fluid inside the guide part 100 may be formed at the same level.

One or more penetration holes through which the fluid can move may be provided at predetermined positions of the fluid inlet portion 121. It is preferable that eight penetration holes are symmetrically disposed in vertical, horizontal, and diagonal directions. Furthermore, at least one penetration hole through which a fluid can move may be provided at a predetermined position on the side surface of the guide part 100. Accordingly, the fluid stored in the fluid storage tank may be more smoothly introduced into the guide part 100.

Meanwhile, as shown in FIG. 1, the guide part 100 may further include an airtight maintenance module 130 coupled to a predetermined position on the top end portion of the body module 110. A signal from the measurement part 300 may pass through the airtight maintenance module 130, but the movement of a fluid or gas may be blocked by the airtight maintenance module 130.

More specifically, the airtight maintenance module 130 may be configured to prevent a fluid or gas outside the fluid storage tank from flowing into the fluid storage tank through the guide part 100 and also prevent a fluid or gas inside the fluid storage tank from being discharged outside the fluid storage tank through the guide part 100. Accordingly, an advantage may arise during the maintenance or replacement of the measurement part 300 to be described later.

Not only a fluid such as LNG but also an inert gas is contained in the fluid storage tank for the purpose of improving safety. The inert gas may be discharged outside the fluid storage tank during the maintenance or replacement of the measurement part 300. When the inert gas is discharged, a problem arises in that an appropriate amount of inert gas needs to be refilled. In order to overcome this problem, the airtight maintenance module 130 may be included.

For example, the airtight maintenance module 130 may be coupled between the adjacent pipe units 111, and may be configured to include a first member (not shown) formed in the shape of a gasket having an open central portion and a second member (not shown) airtightly coupled to the central portion of the first member.

The second member may be coupled to the first member in a replaceable manner. Although this second member is preferably made of any one of polytetrafluoroethylene (PTFE), polycarbonate, carbon fiber reinforced plastic (CFRP), and tempered glass, it is not necessarily limited thereto.

Meanwhile, in the case of the body module 110 located in a direction above the airtight maintenance module 130, it is preferable that a penetration hole is not provided in the side part.

As shown in FIG. 1, the buoyant body 200 may be inserted into the above-described guide part 100, and may be configured to float along the surface of the fluid inside the guide part 100.

Referring to FIGS. 3(b) and 7, the buoyant body 200 may be configured to include an upper module 210, and a lower module 220.

More specifically, as shown in FIG. 7, the buoyant body 200 may include the upper module 210 configured such that a reflective surface 211 is formed at the top end thereof, and the lower module 220 coupled to the bottom end of the upper module 210. At least one buffer module 230 may be coupled to the side of the upper module 210 and configured to prevent the buoyant body 200 from being caught in the guide part 100 when the buoyant body 200 is selectively raised and lowered inside the guide part 100.

More specifically, as shown in FIG. 5, the upper module 210 and the lower module 220 may be formed in structures that pass through the fluid inlet portion 121, but the upper module 210 may be configured such that the movement thereof is blocked in such a manner that the buffer module 230 is caught on the fluid inlet portion 121. This may prevent fluid level measurement from becoming impossible due to the separation of the buoyant body 200 from the guide part 100.

Although the upper module 210 and the lower module 220 may be formed in structures having the same shape, they are not limited thereto, but may be formed in structures having different shapes.

For example, when the upper module 210 and the lower module 220 are formed in structures having the same shape, the upper module 210 and the lower module 220 are preferably formed in cylindrical structures, but are not necessarily limited thereto.

Furthermore, when the upper module 210 and the lower module 220 are formed in structures having different shapes, it is preferable that the upper module 210 is formed in a cylindrical structure and the lower module 220 is formed in a hemispherical shape, but they are not necessarily limited thereto.

Meanwhile, it is preferable that the upper module 210 and the lower module 220 are coupled to each other in an airtight manner. For this purpose, laser hermetic welding may be used. In this case, the end of the upper module 210 may be expanded and surrounded a portion of the lower module 220. This may provide the advantage of improving the ease of welding and airtightness.

The reflective surface 211 is intended to send a signal, transmitted from the measurement part 300 to be described later, back to the measurement part 300 by reflecting the signal. This is intended to overcome the problem in which it is impossible to measure an accurate fluid level because when a measurement target fluid is LNG, it is difficult to distinguish between a signal reflected from the surface of the fluid and a signal reflected from the bottom of the fluid storage tank by using a technique for measuring a fluid level using a signal reflected from the surface of a fluid due to the low dielectric constant of LNG.

Although the reflective surface 211 is preferably formed throughout the overall top surface of the upper module 210 as shown in FIG. 7, it may be formed on a part of the top surface of the upper module 210 as shown in FIG. 8.

Specifically, the reflective surface 211 may be made of a material exhibiting a higher dielectric constant than the fluid stored in the fluid storage tank under the same measurement conditions. More specifically, the reflective surface 211 is preferably made of any one of stainless steel, aluminum, manganese, nickel, and titanium.

Furthermore, although the reflective surface 211 is preferably formed flat without bending, it is not limited thereto. The reflective surface 211 may be formed in a structure that is recessed at a predetermined radius of curvature in a downward direction, or may be formed in a structure that protrudes upward at a predetermined radius of curvature.

Meanwhile, although the reflective surface 211 has been described as being separate from the upper module 210, it is not limited thereto. It is obvious that the reflective surface 211 and the upper module 210 may be integrated into a single body.

Referring to FIGS. 4B and 7, the buffer module 230 may be configured to include a buffer member 231 and a coupling member 232 configured to position the buffer member 231 on the side surface of the upper module 210.

One side of the coupling member 232 may be connected and coupled to the outer peripheral surface of the side surface of the upper module 210, and the buffer member 231 may be coupled to the other side of the coupling member 232. To this end, a hook-shaped protrusion and depression structure may be formed on the other side of the coupling member 232 in a vertical direction.

The coupling member 232 is preferably provided continuously on the outer peripheral surface of the side surface of the upper module 210 in an integrated manner. The coupling member 232 may be provided on the outer peripheral surface of the upper module 210 in a screw shape.

As shown in FIGS. 5 and 7, one side of the buffer member 231 may be formed in a structure protruding toward the inner circumferential surface of the guide part 100 at a predetermined radius of curvature, and a predetermined gap may be formed between the buffer member 231 and the inner circumferential surface of the guide part 100.

This is intended to prevent the problem in which when the buffer member 231 and the inner circumferential surface of the guide part 100 come into contact with each other, the buffer member 231 is caught when being selectively raised and lowered depending on the surface of the fluid, or a reflective surface is formed obliquely with respect to the surface of the fluid, thereby deteriorating the accuracy of fluid level measurement.

Furthermore, although the top end surface of the buffer member 231 is preferably formed to be inclined at a predetermined angle toward the bottom end surface of the buffer member 231, it is not necessarily limited thereto. It is obvious that it may be formed in various shapes as needed. Furthermore, at least one penetration hole through which a fluid can move may be provided at a predetermined position of the buffer member 231.

This is configured to, even when the fluid to be measured moves to the top end of the buoyant body 200 through the predetermined gap between the buffer member 231 and the inner circumferential surface of the guide part 100, allow the fluid to flow down along the inclined surface of the buffer member 231 or move through the penetration hole of the buffer member 231, so that the parallelism of the buoyant body 200 can be maintained, thereby improving the accuracy of fluid level measurement.

Although the buffer member 231 is preferably made of a polytetrafluoroethylene (PTFE) material, it is not necessarily limited thereto. It is obvious that it may be made of various materials as needed.

The coupling member 232 may include a plurality of coupling members 232 that are provided to be spaced apart from each other on the outer peripheral surface of the side surface of the upper module 210. In this case, it is preferable that at least three coupling members 232 are provided to be spaced apart from each other at the same intervals.

When the plurality of coupling members 232 is provided to be spaced apart from each other, the coupling members 232 may be coupled to the outer peripheral surface of the side surface of the upper module 210 in the form of annular rings, and the buffer member 231 may be configured to be coupled while passing through and surrounding the annular rings.

Meanwhile, referring to FIGS. 3(a) and 8, the upper module 210 further includes an absorption wall 212 that is formed on the reflective surface 211 to a predetermined length and at a predetermined angle.

The absorption wall 212 may be made of a material exhibiting a lower dielectric constant than that of the reflective surface 211 under the same measurement conditions. Accordingly, it may be possible to have the advantage of improving the accuracy of fluid level measurement by filtering a signal reflected from the reflective surface 211 under a predetermined condition.

The absorption wall 212 may be formed along the edge of the reflective surface 211. It is preferable that at least one penetration hole through which a fluid can move is provided at a predetermined position of the absorption wall 212. This may prevent the accuracy of fluid level measurement from being deteriorated due to the accumulation of the fluid between the absorption wall 212 and the reflective surface 211.

Furthermore, referring to FIGS. 7 and 8, the lower module 220 may be configured to further include a parallel maintenance module 221 that is placed inside the lower module 220 and maintains the reflective surface 211 in parallel with the surface of the fluid.

For example, the parallel maintenance module 221 may include a rod-shaped support unit (not shown) configured to pass through the center of gravity of the buoyant body 200 in a direction perpendicular to the reflective surface 211 inside the buoyant body 200 and to connect the upper module 210 and the lower module 220 to each other, and a weight unit (not shown) coupled to a predetermined position of the support unit.

The weight unit may be coupled to come into contact with the bottom end of the inner side of the lower module 220, and the centers of gravity of the buoyant body 200, the support unit, and the weight unit are preferably configured to be positioned on a straight line.

As shown in FIG. 1, the measurement part 300 may be configured to measure the level of the fluid inside the fluid storage tank by being coupled to the top end of the guide part 100, transmitting a signal toward the buoyant body 200 in the inner space of the guide part 100, and receiving a signal reflected from the buoyant body 200.

To this end, the measurement part 300 may be configured to include a transmission/reception module (not shown) configured to transmit and receive signals and a computation module (not shown) configured to calculate a distance to the surface of a fluid by analyzing a signal reflected from the buoyant body 200. The computation module may be provided with information necessary for computation in advance.

Meanwhile, although the signal is preferably a frequency-modulated continuous wave (FMCW) radar signal, it is not necessarily limited thereto. It is obvious that the signal may be configured in various manners as needed.

Therefore, the fluid level measurement system using a buoyant body according to the embodiment of the present disclosure has the advantage of being able to measure a fluid level based on a signal, reflected from the reflective surface of the buoyant body, by using the buoyant body that is inserted into the guide part and selectively raised and lowered depending on the level of a fluid. The buoyant body has the advantage of preventing itself from being caught in the guide part when it is selectively raised and lowered inside the guide part depending on the level of a fluid and improving the accuracy of fluid level measurement by maintaining the reflective surface in parallel with the surface of the fluid.

Furthermore, there is an advantage in that the accuracy of fluid level measurement can be further improved by filtering an inaccurate signal through the structure of the absorption wall. The cost used for refilling an inert gas can be reduced by preventing the inert gas from being discharged outside the fluid storage tank during the maintenance or replacement of the measurement part according to the present disclosure using the airtight maintenance module.

Meanwhile, although the fluid to be measured has been described as cryogenic LNG in the fluid level measurement system using a buoyant body according to the embodiment of the present disclosure, the fluid is not limited thereto. It is obvious that the fluid level measurement system may be applied to oil, ammonia, or hydrogen.

Although the above description has been given with reference to the drawings according to the embodiments of the present disclosure, those of ordinary skill in the art to which the present invention pertains may make various applications, modifications and adaptations within the scope of the present invention based on the above content.

What is claimed is:

1. A fluid level measurement system using a buoyant body, the fluid level measurement system comprising:
   a guide part installed in a direction perpendicular to a bottom surface of a fluid storage tank, and provided with a space in which a fluid is allowed to move therein;
   a buoyant body inserted into the guide part, and configured to float along a surface of the fluid inside the guide part;
   a measurement part coupled to a top end of the guide part, and configured to measure a level of a surface of the fluid inside the fluid storage tank by transmitting a signal toward the buoyant body in an inner space of the guide part and then receiving a signal reflected from the buoyant body; and
   at least one buffer member coupled to an upper end of a side surface of the buoyant body to prevent the buoyant body from being caught in the guide part when the buoyant body is ascended and descended inside the guide part,
   wherein the buffer member is formed to protrude toward an inner circumferential surface of the guide part, and an outer radial end thereof is formed to have a predetermined radius of curvature, and
   wherein the buffer member is made of polytetrafluoroethylene (PTFE).

2. The fluid level measurement system of claim 1, wherein the guide part includes a body assembly formed by coupling at least two pipe units and an end assembly coupled to a bottom end of the body assembly, and a fluid inlet portion in a ring plate shape is provided at one end of the end assembly.

3. The fluid level measurement system of claim 2, wherein the buoyant body includes an upper body provided with a reflective surface at a top end thereof, and a lower body coupled to a bottom end of the upper body.

4. The fluid level measurement system of claim 3, wherein the upper body and the lower body are formed to have a smaller diameter than an inner diameter of the fluid inlet portion such that the upper body and the lower body is capable of passing through the fluid inlet portion, and movement of the upper body is blocked by the buffer member abutting the fluid inlet portion.

5. The fluid level measurement system of claim 3, wherein the upper body and the lower body are formed in cylindrical shape.

6. The fluid level measurement system of claim 3, wherein the upper body is formed in a cylindrical shape, and the lower body is formed in a hemispherical shape.

7. The fluid level measurement system of claim 3, wherein the reflective surface is made of stainless steel, aluminum, manganese, nickel, or titanium.

8. The fluid level measurement system of claim 2, wherein at least one penetration hole through which the fluid is allowed to move is provided at a predetermined position of the fluid inlet portion.

9. The fluid level measurement system of claim 2, wherein the guide part further includes an airtight maintenance member coupled to a predetermined position of a top end of the body assembly, a signal from the measurement part passes through the airtight maintenance member, and movement of a fluid or gas is blocked by the airtight maintenance member.

10. The fluid level measurement system of claim 1, wherein the buffer member includes at least one penetration hole that connects a top surface of the buffer member and a bottom surface of the buffer member to allow the fluid to move through the at least one penetration hole.

11. The fluid level measurement system of claim 1, wherein the buoyant body includes a parallel maintenance member disposed at a bottom end thereof.

* * * * *